3,449,402
PRODUCTION OF ACRYLONITRILE
Robert J. Evans, Jacksonville, Ill., and Keith M. Taylor, Ballwin, Mo., assignors to Monsanto Company, St. Louis, Mo., a corporation of Delaware
No Drawing. Filed Jan. 9, 1967, Ser. No. 607,892
Int. Cl. C07c 121/32
U.S. Cl. 260—465.9
10 Claims

ABSTRACT OF THE DISCLOSURE

Acrylonitrile is produced by a non-catalytic process from acetonitrile and an aliphatic sulfur-containing compound.

---

The present invention relates to a new and novel non-catalytic process for the direct synthesis of acrylonitrile from acetonitrile and aliphatic sulfur-containing compounds.

Acrylonitrile is one of the most valuable monomers available to the polymer industry today. This monomer is used in the preparation of synthetic fibers, synthetic rubbers and other useful plastic products. Presently, most of the acrylonitrile is produced by such catalytic processes as the catalytic reaction of acetylene and hydrogen cyanide and the reaction of ammonia and propylene. While the known catalytic processes have proven effective in producing acrylonitrile, the demand for acrylonitrile is so great as to make desirable the development of new and additional processes for producing acrylonitrile. Also, in general, the catalysts often used in acrylonitrile production are relatively expensive in cost and handling. For these and other reasons, it would be advantageous to have non-catalytic means of producing acrylonitrile.

Summary

It is an object of the present invention to provide a new and novel non-catalytic process for the production of acrylonitrile. An additional object of the present invention is to provide a new and novel process for the production of acrylonitrile by the non-catalytic direct reaction of acetonitrile and aliphatic sulfur-containing compounds. Additional objects will become apparent from the following description of the invention herein disclosed.

The present invention, which fulfills these and other objects, is a process for the preparation of acrylonitrile which comprises subjecting acetonitrile and an aliphatic sulfur-containing compound to a temperature within the range of 750 to 1100° C. for a period of 0.1 to 20 seconds in the absence of a catalyst. By this process, significant quantities of acrylonitrile are produced and is produced non-catalytically. Since no catalyst is used, the present process results in an alleviation of the expenses resulting from catalysts.

Description of preferred embodiments

In order to further describe as well as to demonstrate the present invention, the following examples are presented.

EXAMPLE I

A mixture of substantially equimolar quantities of acetonitrile and methyl mercaptan was passed through a reactor tube having a length of 12 inches and an internal diameter of one inch. Nitrogen, as an inert diluent, was introduced into the reactor tube concurrently with the mixture of acetonitrile and methyl mercaptan. The temperature within the reaction tube was approximately 950° C. and the residence time of the reactants within the reaction zone was 3 seconds. The effluent from the reactor tube was passed through a condenser and a liquid product obtained. This liquid product was found to contain 4% by weight of acrylonitrile with the remainder of the liquid product being primarily unreacted acetonitrile.

EXAMPLE II

Example I was substantially repeated with the exception that the temperature was 1000° C. On analysis, the liquid product of this run was found to contain approximately 5% by weight acrylonitrile, the majority of the remainder of the liquid product being unreacted acetonitrile.

EXAMPLE III

Example II was substantially repeated with the exception that the temperature was 800° C. and the alkyl sulfur-containing compound was methyl sulfide. The liquid product was found to contain approximately 4% by weight acrylonitrile, the remainder of the liquid product being primarily unreacted acetonitrile.

EXAMPLE IV

Example I was substantially repeated with the exception that the temperature was 950° C. and the alkyl sulfur-containing compound was dimethylsulfoxide. The liquid product was found to contain 4% by weight acrylonitrile, the remainder of the liquid product being primarily unreacted acetonitrile.

EXAMPLE V

Example IV was substantially repeated with the exception that the temperature was 1000° C. The liquid product was found to contain approximately 8% by weight acrylonitrile, the remainder of the liquid product being primarily unreacted acetonitrile.

EXAMPLE VI

Example I was substantially repeated with the exception that the alkyl sulfur-containing compound was methyl disulfide and the temperature was 800° C. The liquid product was found to contain significant quantities of acrylonitrile.

From the above examples, it is readily noted that the present invention represents a means to produce significant quantities of acrylonitrile without the use of a catalyst.

The aliphatic sulfur-containing compounds most often used in the process of the present invention include the aliphatic mercaptans, aliphatic sulfides, aliphatic disulfides, aliphatic sulfoxides and combinations thereof. The aliphatic radicals of the aliphatic sulfur-containing compounds may be straight-chain or branched-chain in structure and may be saturated or unsaturated. In the aliphatic sulfur-containing compounds having two aliphatic radicals, the two radicals may be the same or different. Usually the aliphatic radicals will contain less than 10 carbon atoms and preferably are alkyl radicals. Suitable aliphatic sulfur-containing compounds include methyl mercaptan, ethyl mercaptan, propyl mercaptans, butyl mercaptans, hexyl mercaptans, octyl mercaptans, decyl mercaptans, methyl sulfide, ethyl sulfide, methyl ethyl sulfide, propyl sulfides, hexyl sulfides, propyl ethyl sulfide, methyl disulfide, ethyl disulfide, dimethyl sulfoxide, diethyl sulfoxide, methyl ethyl sulfoxide, methyl propyl sulfoxide, and the like. In the preferred practice of the present invention, the aliphatic radicals are alkyl radicals containing 1 to 3 carbon atoms. The preferred alkyl sulfur-containing compounds are the alkyl mercaptans, alkyl sulfides and alkyl sulfoxides.

The acetonitrile and the aliphatic sulfur-containing compound most often are employed in a molar ratio of acetonitrile to aliphatic sulfur-containing compound within the range of 15:1 to 1:15. The preferred mol ratio will vary to some extent with the molecular weight of the aliphatic sulfur-containing compound employed. In a general sense, it may be said that higher ratios of acetonitrile to aliphatic sulfur-containing compound may be used as the molecular weight of the aliphatic sulfur-containing compound increases. This results from the fact that at the temperatures at which the process is carried out, some cracking of the aliphatic radicals may take place making aliphatic radicals available for possible formation of acrylonitrile by reaction with the acetonitrile. With the preferred aliphatic sulfur-containing compound herein above defined, acetonitrile to aliphatic sulfur-containing compound mol ratios within the range of 4:1 to 1:4 are usually employed in the practice of the present invention.

The temperatures at which the process of the present invention is operated, generally, are within the range of 750 to 1100° C. At temperatures below 750° C., reaction is below practical limitations. Above 1100° C., cracking of the reactants becomes excessive. In the preferred practice of the process of the present invention, temperatures within the range of 850 to 1000° C. most often are used.

The pressure at which the process of the present invention is operated is not particularly critical and may be varied over wide ranges. The pressure may be subatmospheric, atmospheric or superatmospheric. Most often, the pressure at which the process of the present invention is operated will be within the range of 5 to 100 p.s.i.a. As a practical matter, the present invention is usually operated at or near atmospheric pressure, i.e., 14.5 to 20 p.s.i.a.

In operating the present process, the residence time of the acetonitrile and aliphatic sulfur-containing compound within the reaction zone most often is within the range of 0.1 to 20 seconds. The optimum residence time will vary according to temperatures, lower residence time being used with higher temperatures and conversely, longer residence time being used with lower temperatures. In the preferred practice of the process of the present invention, a residence time of 0.5 to 10 seconds is most often employed.

In carrying out the process of the present invention, it is often desirable to carry out the reaction of the acetonitrile and aliphatic sulfur-containing compound in the presence of a diluent. Such a diluent is inert to the chemical reaction taking place within the reaction zone. Exemplary of materials which may be used as diluents are nitrogen, helium, argon, carbon dioxide and the like. Among the preferred diluents are nitrogen and argon. When a diluent is used, it may be used in practically any concentration. However, as a practical matter, the diluent is most often present in a mol ratio of diluent to combined acetonitrile and aliphatic sulfur-containing compound within the range of 0.25:1 to 3:1.

What is claimed is:
1. A process for the preparation of acrylonitrile which comprises subjecting acetonitrile and an aliphatic sulfur-containing compound selected from the group consisting of alkyl mercaptans, alkyl sulfides, alkyl disulfides, alkyl sulfoxides and combinations thereof, wherein the alkyl groups have less than 10 carbon atoms, to a temperature within the range of 750 to 1100° C. for a period of 0.1 to 20 seconds in the absence of a catalyst.

2. The process of claim 1 wherein the mol ratio of acetonitrile to aliphatic sulfur-containing compound is within the range of 15:1 to 1:15.

3. The process of claim 2 wherein said compound is methyl mercaptan.

4. The process of claim 2 wherein said compound is methyl sulfide.

5. The process of claim 2 wherein said compound is dimethylsulfoxide.

6. The process of claim 2 wherein said compound is methyl disulfide.

7. The process of claim 1 wherein the temperature is within the range of 850 to 1000° C.

8. The process of claim 1 wherein the pressure is within the range of 5 to 100 p.s.i.a.

9. The process of claim 1 wherein the acetonitrile and aliphatic sulfur-containing compounds are subjected to the reaction conditions in the presence of an inert diluent.

10. The process of claim 9 wherein the inert diluent is selected from the group consisting of nitrogen, helium, argon, carbon dioxide and combinations thereof.

References Cited

UNITED STATES PATENTS 3,055,738   9/1962   Krebaum.

JOSEPH P. BRUST, *Primary Examiner.*